US005469703A

United States Patent [19]

Ericsson et al.

[11] Patent Number: 5,469,703

[45] Date of Patent: Nov. 28, 1995

[54] DEVICE FOR CONTROLLING A HYDRAULIC MOTOR

[75] Inventors: Lars P. Ericsson, Dalsjöfors; Bo Nilstam, Borås, both of Sweden

[73] Assignee: VOAC Hydraulics Boras AB, Boras, Sweden

[21] Appl. No.: 258,082

[22] Filed: Jun. 10, 1994

[30] Foreign Application Priority Data

Jun. 11, 1993 [SE] Sweden ..................................... 9302031

[51] Int. Cl.[6] .................................................. F16D 31/02

[52] U.S. Cl. ............................... 60/399; 60/452; 91/448

[58] Field of Search ............................ 60/399, 422, 452, 60/403; 91/514, 532, 448

[56] References Cited

U.S. PATENT DOCUMENTS

| | | | |
|---|---|---|---|
| 4,617,854 | 10/1986 | Kropp | 91/517 |
| 5,062,266 | 11/1991 | Yoshimatsu . | |
| 5,152,140 | 10/1992 | Hirata et al. | 60/452 |

FOREIGN PATENT DOCUMENTS

| | | | |
|---|---|---|---|
| 244604 | 9/1992 | Japan | 60/452 |
| 92/09809 | 6/1992 | WIPO | 60/452 |

*Primary Examiner*—F. Daniel Lopez
*Attorney, Agent, or Firm*—Frishauf, Holtz, Goodman, Langer & Chick

[57] ABSTRACT

A device for controlling a hydraulic motor (10) comprises a directional valve (15) connected to a pressure fluid pump (11; 50) via a feed passage (17) and a pilot valve (19) activated safety shut-off valve (18) incorporated in the pressure fluid feed passage (17) between the pump (11; 50) and the directional valve (15) and shiftable from a normally open position to a closed position to, thereby, block the fluid communication between the pump (11; 50) and the directional valve (15) in emergency situations. A shunt valve (16) for short circuiting at least a part of the pump flow to a tank or, alternatively a displacement adjusting means (51) of a variable displacement pump (50) are activated by a load sensing pressure derived from a load sensing port (**15*e*) on the directional valve (15), which load sensing pressure is discharged to tank (12) via the shut-off valve (18**) as the latter is shifted to its closed position.

9 Claims, 3 Drawing Sheets

DEVICE FOR CONTROLLING A HYDRAULIC MOTOR

BACKGROUND OF THE INVENTION

This invention concerns a device for controlling a hydraulic motor, particularly a device comprising a directional valve for directing hydraulic fluid from a pressure source to the motor, and a separate safety valve means for preventing hydraulic fluid under pressure from reaching the directional valve when activated.

The purpose of a control device of the above type including the safety valve is to accomplish an interruption of the hydraulic fluid supply to the directional valve and, thereby, a deactivation of the motor in emergency situations.

In previous devices of the above described type, as the one disclosed in U.S. Pat. No. 5,062,266, interruption of the hydraulic fluid supply to the directional valve is accomplished by opening up of a drain passage to a tank for discharging the pump pressure.

In some cases, however, this prior art type of safety means does not provide the intended safety function, namely at operation under low temperature conditions where the viscosity of the hydraulic fluid is increased. In such cases, a certain pressure tends to remain in the system, despite the opened drain passage. This means that there is a risk that the motor will still perform some movement after the safety means activation, which may be hazardous to people and or equipment.

The main object of the invention is to accomplish an improved device for controlling a hydraulic motor by which the features of the safety valve means ensure that there is no remaining pressure in the system and that no undesirable movement of the motor will occur after activation of the safety valve means.

Other objects and advantages of the invention will appear from the following description and claims.

Preferred embodiments of the invention are described below with reference to the accompanying drawings.

DETAILED DESCRIPTION

Figure 1:
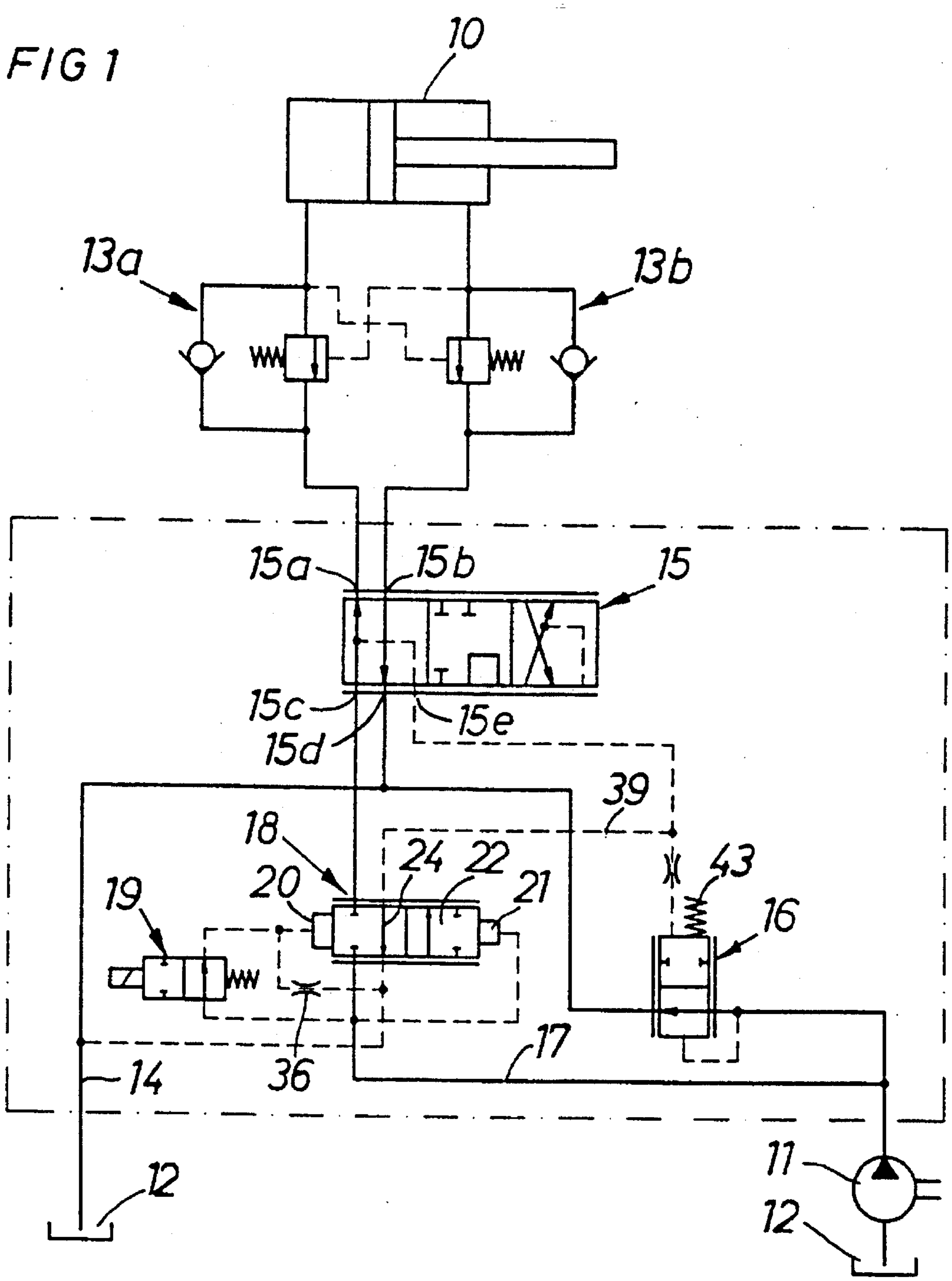
FIG. 1 shows schematically a device according to the invention.

The device illustrated in FIG. 1 comprises a hydraulic motor 10, a pressure source formed by a pump 11, and a tank 12. The fluid communicating ports of the motor 10 are provided with over-center valves 13*a* and 13*b*, respectively, which provide safety against hazardous motor movements in case of sudden accidental pressure drops.

A directional valve 15 has its service ports 15*a, b* connected to the motor 10 via the over-centre valves 13*a, b*, and communicates via an inlet port 15*c* with the pump 11. A drain port 15*d* of the valve 15 is connected to the tank 12 via a drain passage 14.

A load sensing pressure port 15*e* of the valve 15 is connected to a shunt valve 16 to balance the latter together with a spring force against the pump pressure. The outlet of the shunt valve 16 is also connected to the tank 12 via the drain passage 14.

A safety valve 18 is located in the feed line 17 between the pump 11 and the inlet port 15*c* of the directional valve 15. This safety valve 18 is shiftable between a normally open position and a closed position in which latter position it blocks the fluid communication between the pump 11 and the directional valve 15.

An electromagnetic pilot valve 19 is provided to direct, when activated, the pump pressure to the larger one 20 of a pair of differential activating surfaces 20, 21 on the valve element 22 of the safety valve 18, whereas the pump pressure acts continuously on the smaller one 21 of these two activating surfaces.

The flow breaking safety valve 18 also has a drain passage 24 by which the load sensing pressure port 15*e* of the directional valve 15 is connected to the tank 12 as the valve 18 occupies its closed position.

Figure 2:
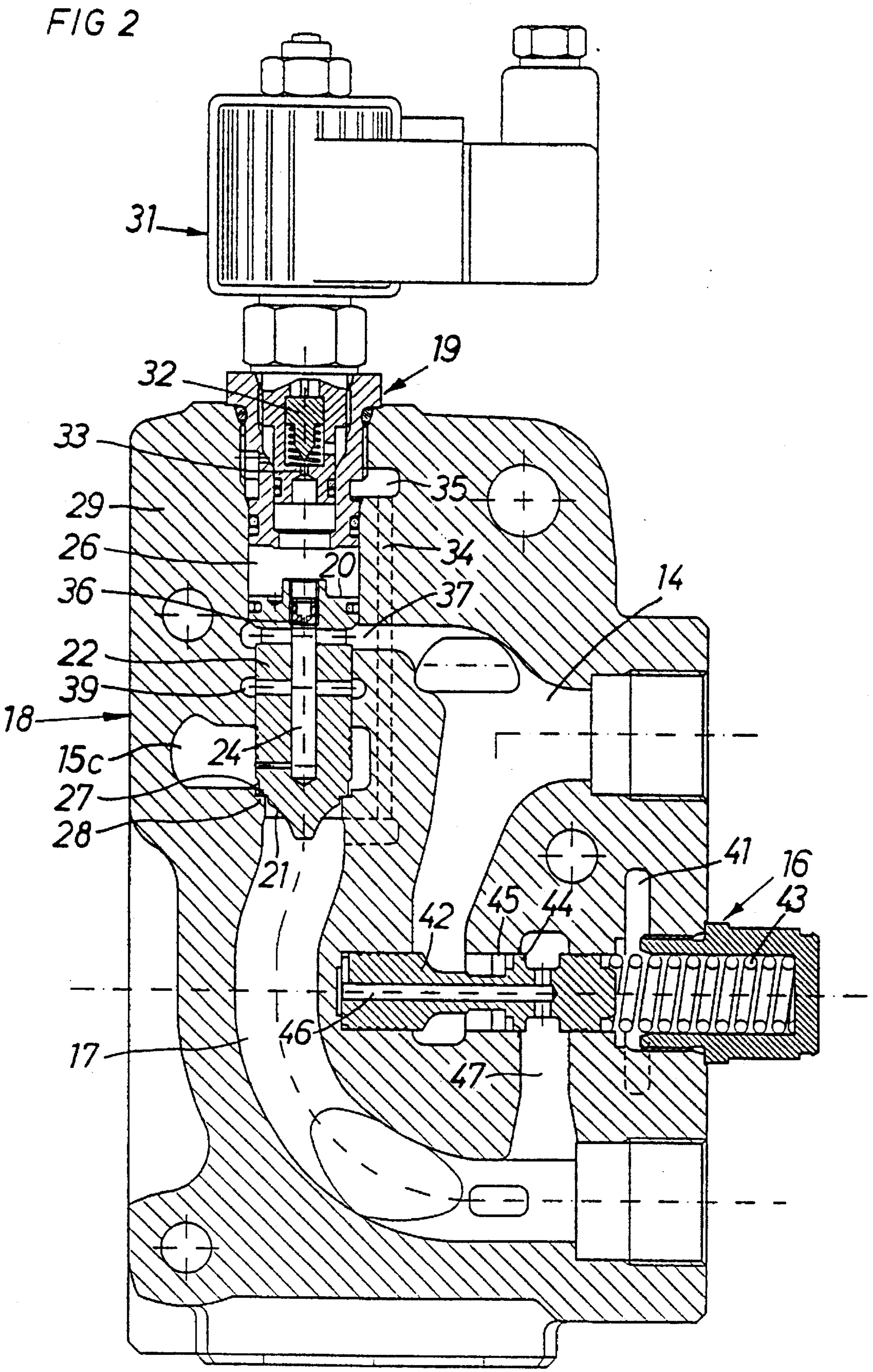
FIG. 2 shows a section through a safety valve means according to the invention.

In FIG. 2, the details of the safety valve 18 and its pilot valve 19 are illustrated. Accordingly, the valve element 22 is displaceably guided in a bore 26 and is formed with an annular shoulder 27 for sealing cooperation with a seat 28 in the valve housing 29. The valve seat 28 is located in the feed line passage 17 such that the latter is blocked by the valve element 22 as the shoulder 27 sealingly engages the seat 28.

In the upper part of the bore 26, the pilot valve 19 is inserted. The latter comprises an electromagnetic actuating device 31 and a tapered valve element 32 controlling a pilot flow opening 33. A full pressure passage 34 extends from the feed line passage 17 to an inlet chamber 35 of the pilot valve 19, and a discharge opening 37 connects the bore 26 with the tank 12 via the drain passage 14.

It is to be understood that the electromagnetic actuator may be connected to any type of operation control and monitoring equipment for obtaining an activation signal. That is not a part of this invention and is therefore not included in this description.

A load sensing pressure passage 39 in the valve housing 29 communicates with the port 15*e* of the directional valve 15, and the drain passage 24 in the valve element 22 is arranged to connect the passage 39 with the discharge opening 37 as the valve element 22 occupies its closed position. A small flow restriction 36 in the valve element 22 is intended to bleed off fluid from bore 26 to the discharge opening 37 via passage 24.

In FIG. 2 there is also shown the details of the shunt valve 16 by which the actual surplus flow from the pump 11 is short circuited to the tank 12 via the drain passage 14. The valve spindle 42 of the shunt valve 16 is movably guided in a bore 45 and is acted upon in the opening direction by the pump pressure and in the closing direction by a spring 43 and the actual load pressure supplied via a chamber 41. In the closed position of the shunt valve 16, a land 44 on the valve spindle 42 sealingly cooperates with the bore 45.

A longitudinal bore 46 in the valve spindle 42 communicates the pump pressure from an inlet chamber 47 to the left end of the valve spindle 42.

In operation, as illustrated in FIG. 1, the pump 11 is arranged to deliver hydraulic fluid under pressure via the feed line 17 and the directional valve 15 to the motor 10. The hydraulic fluid has to pass the safety valve 18, the inlet port 15*c*, the service port 15*a*, and the over centre valve 13*a*. Depending on the opening degree of the directional valve 15 a certain portion of the fluid flow from the pump 11 is short circuited to tank 12 via the shunt valve 16.

The size of the shunted portion of the pump flow depends both on the back pressure from the directional valve 15, i.e. the pressure in the feed line 17, and on the actual load sensing pressure provided from the port 15*e* of the directional valve 15.

In the illustrated operation condition, the directional valve 15 and the shunt valve 16 are both open to show that a certain part only of the pump flow is supposed to actuate the motor 10. It is also shown that the pilot valve 19 has been activated and provides the pump pressure to the larger end surface 20 of the safety valve element 22, whereby the force accomplished on the opposite smaller end surface 21 by the pump pressure can no longer maintain the valve element 22 in open position. The safety valve 18 is closed, and the fluid flow to the inlet port 15*c* of the directional valve 15 is broken.

Simultaneously with the closure of the safety valve 18, i.e. the interruption of the motive fluid flow through the feed line 17, the passage 24 of the valve element 22 connects the load sensing pressure port 15*e* to the tank 12 via the discharge opening 37 and the drain passage 14. Since the pressure in the feed line passage 17 has now increased and the load sensing pressure has been removed, the shunt valve 16 is fully open to lead off the entire pump flow to the tank 12.

Figure 3:
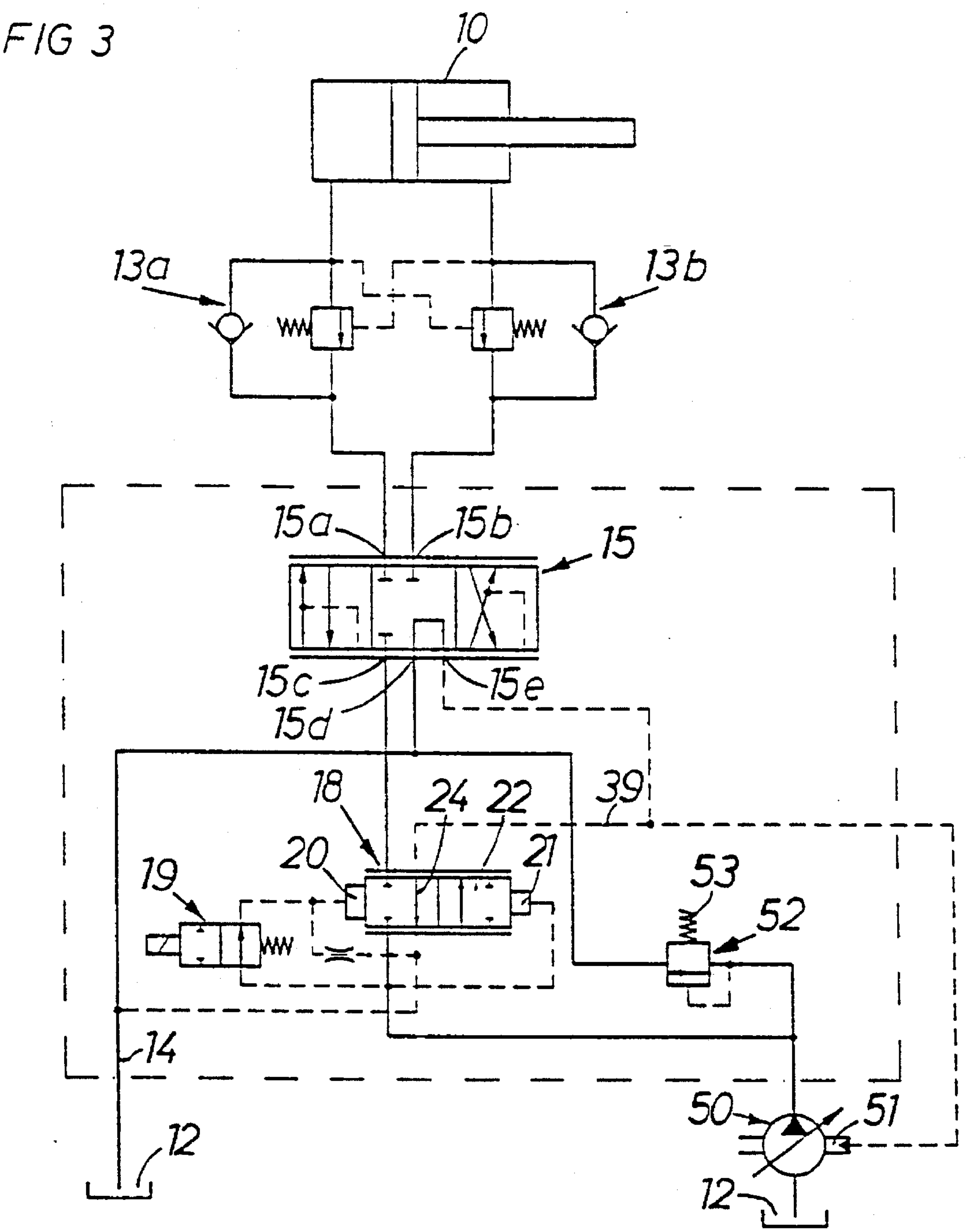
FIG. 3 shows schematically a device according to another embodiment of the invention.

As illustrated in FIG. 3, an alternative device comprises a pump 50, the displacement of which is variable by a pressure activated adjusting means 51 connected to the load sensing pressure port 15*e* of the directional valve 15. The displacement adjusting means 51 of the pump 50 is arranged to increase the output flow and pressure of the pump 50 at increasing load sensing pressure communicated from the load sensing pressure port 15*e* and, oppositely, to decrease the output flow and pressure of the pump 50 at sinking load pressure.

Accordingly, when the safety valve 18 is closed in an emergency situation, the load pressure is instantly decreased to zero as the load sensing pressure port 15*e* of the directional valve 15 is discharged to the tank 12 via the drain passage 14 which results in an immediate and substantial reduction of the pump output flow and pressure by means of the displacement adjusting means 51.

In this embodiment of the invention, there is provided a shunt valve 52 which has no load pressure responsive means, but is balanced between the pump pressure and a spring 53 to open up a shunt passage to the tank 12 as the pump pressure exceeds a certain predetermined level.

Looking at FIG. 2, a safety shut-off signal delivered to the electromagnetic actuating device 31 of the pilot valve 19 results in a raising of the valve element 32 and opening up of a communication through the passage 34 and the inlet chamber 35 between the feed passage 17 and the bore 26. This means that the pump pressure is able to reach the upper larger end surface 20 of the valve element 22, and due to the difference in size between the two differential surfaces 20, 21, the valve element 22 is shifted to its closed position. The annular shoulder 27 on the valve element 22 engages the seat 28 and the feed passage 17 is closed.

At the same time, the passage 24 in the valve element 22 connects the load sensing pressure passage 39 to the discharge opening 37.

The safety valve 18 remains closed as long as the pilot valve 19 is activated to communicate the pump pressure to the upper end surface 20 of the valve element 22. When the pilot valve 19 is closed, however, the pressure in the bore 26 is discharged via the restriction 36, and the pump pressure acting on the lower end surface 21 of the valve element 22 moves the latter upwards to reopen the feed passage 17.

As the safety valve 18 is open, the load sensing pressure passage 39 is closed by the valve element 22, which means that the load sensing pressure will again be built up and act upon the shunt valve 16 to thereby load the latter in the closing direction.

We claim:

1. Device for controlling the operation of a hydraulic motor (10), comprising a directional valve (15) communicating with a pressure fluid pump (11, 50) via a feed passage (17) and provided with load sensing pressure communicating means (15*e*) connected to a pressure activated pressure adjusting means (16; 51) for varying the fluid pressure within said feed passage ((17) in relation to the load sensing pressure, and a safety valve means (18, 19) located in said feed passage (17) upstream of said directional valve (15) and arranged to be activated separately from said directional valve (15) to prevent hydraulic fluid under pressure from reaching said directional valve (15) in an emergency, wherein said safety valve means (18, 19) comprises a shut-off valve (18) located in said feed passage (17) and shiftable between a normally open position and a closed fluid flow blocking position, said shut-off valve (18) comprises a load sensing pressure passage (39) which is connected to said load sensing pressure communicating means (15*e*), and a pressure discharge passage (14), said load sensing pressure passage (39) is connected to said pressure discharge passage (14) via said shut-off valve (18) as the latter is shifted from said open position to said closed position so as to depressurize said pressure adjusting means (16; 51) and hence substantially reduce the fluid pressure in said feed passage (17).

2. Device according to claim 1, wherein said shutoff valve (18) is pressure activated and comprises a valve element (22) with two oppositely facing actuating surfaces (20, 21) of different sizes, the smaller one (21) of which is continuously exposed to the pressure within said feed passage (17) for exerting a bias force in the opening direction of said valve element (22), whereas the larger one (20) of said actuating surfaces is selectively brought into communication with said feed passage (17) by means of a pilot valve (19) for exerting a force in the closing direction on said valve element (22).

3. Device according to claim 2, wherein said pressure adjusting means (16); 51) comprises a shunt valve (16) communicating with said feed passage (17) upstream of said shut-off valve (18) and arranged to discharge to a tank (12) the pump flow as said shut-off valve (18) is shifted to its closed position.

4. Device according to claim 2, wherein said pressure adjusting means (16: 51) comprises a displacement adjusting means (51) included in said pump (50).

5. Device according to claim 1, wherein said pressure adjusting means (16; 51) comprises a shunt valve (16) communicating with said feed passage (17) upstream of said shut-off valve (18) and arranged to discharge to a tank (12) the pump flow as said shut-off valve (18) is shifted to its closed position.

6. Device according to claim 1, wherein said pressure adjusting means (16; 51) comprises a displacement adjusting means (51) included in said pump (50).

7. A device for controlling operation of a hydraulic motor, comprising:

a pressure adjusting means which is selectively in fluid communication with a feed passage connected with a pressure fluid pump;

a directional valve communicating with said pressure fluid pump via said feed passage, said directional valve including load sensing pressure communicating means connected to said pressure activated pressure adjusting means for varying fluid pressure within said feed passage in relation to a load sensing pressure sensed thereby; and a safety valve means located in said feed passage upstream of said directional valve and arranged to be activated separately from said directional valve to prevent hydraulic fluid under pressure from reaching the directional valve in an emergency, said safety valve means including:

a pressure activated shut-off valve located in said feed passage and shiftable between a normally open position and a closed fluid flow blocking position, said shut-off valve having:

a load sensing pressure passage which is connected to said load sensing pressure communicating means, a pressure discharge passage, said load sensing pressure passage being connected to said pressure discharge passage via said shut-off valve as the latter is shifted from said open position to said closed position so as to depressurize said pressure adjusting means, and a valve element with two oppositely facing actuating surfaces of different sizes, the smaller one of which is continuously exposed to the pressure within said feed passage for exerting a bias force in an opening direction of said valve element; and a pilot valve for selectively bringing the larger one of said actuating surfaces into communication with said feed passage for exerting a force in a closing direction of said valve element.

8. A device according to claim 7, wherein said pressure adjusting means comprises a shunt valve communicating with said feed passage upstream of said shut-off valve and arranged to discharge pump flow to a fluid reservoir tank as said shut-off valve is shifted to its closed position.

9. A device according to claim 7, wherein said pressure adjusting means comprises a displacement adjusting means included in said pump.

* * * * *